(12) United States Patent
Sawaguchi

(10) Patent No.: US 8,107,130 B2
(45) Date of Patent: Jan. 31, 2012

(54) IMAGE PROCESSING DEVICE

(75) Inventor: Kenji Sawaguchi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1112 days.

(21) Appl. No.: 11/210,702

(22) Filed: Aug. 25, 2005

(65) Prior Publication Data

US 2006/0050302 A1    Mar. 9, 2006

(30) Foreign Application Priority Data

Sep. 6, 2004   (JP) ................................. 2004-258213

(51) Int. Cl.
*H04N 1/00* (2006.01)
(52) U.S. Cl. ....................................... 358/403
(58) Field of Classification Search .................... None
See application file for complete search history.

(56) References Cited

U.S. PATENT DOCUMENTS

| | | | | |
|---|---|---|---|---|
| 5,383,029 A * | 1/1995 | Kojima | ........................ | 358/403 |
| 5,406,384 A * | 4/1995 | Sakuragi | ...................... | 358/403 |
| 5,680,223 A * | 10/1997 | Cooper et al. | ................ | 358/403 |
| 5,899,581 A * | 5/1999 | Kawamura et al. | .......... | 386/120 |
| 6,462,778 B1 * | 10/2002 | Abram et al. | ................. | 348/239 |
| 6,590,673 B2 * | 7/2003 | Kadowaki | ...................... | 358/1.15 |
| 6,751,603 B1 * | 6/2004 | Bauer et al. | .......................... | 1/1 |
| 6,825,854 B1 * | 11/2004 | Beneke et al. | ................ | 345/619 |
| 6,873,435 B1 * | 3/2005 | Tehranchi et al. | ............ | 358/1.9 |
| 6,885,481 B1 * | 4/2005 | Dawe | ............................... | 358/505 |
| 2003/0123112 A1 * | 7/2003 | Kajita et al. | ................... | 358/538 |
| 2004/0148453 A1 * | 7/2004 | Watanabe et al. | ................. | 711/1 |
| 2004/0205622 A1 * | 10/2004 | Jones et al. | ..................... | 715/523 |
| 2004/0220925 A1 * | 11/2004 | Liu et al. | ............................ | 707/3 |
| 2005/0041860 A1 * | 2/2005 | Jager | ............................. | 382/173 |
| 2007/0027911 A1 * | 2/2007 | Hakala et al. | .............. | 707/104.1 |

FOREIGN PATENT DOCUMENTS

| | | |
|---|---|---|
| JP | 05-012341 | 1/1993 |
| JP | 2002-169715 A | 6/2002 |
| JP | 2004-192499 A | 7/2004 |

OTHER PUBLICATIONS

"Windows: Saving Files," by Vines, Rose. Pages provided as they appeared for Jan. 22, 2000 and May 31, 2000, as demonstrated by the Internet Archive. Original URL: http://www.geekgirls.com/windows_saving_files.htm Internet Archive URL: http://web.archive.org/web/20000122025716/http://geekgirls.com/windows_saving_files.htm.*

* cited by examiner

*Primary Examiner* — Neveen Abel Jalil
*Assistant Examiner* — Daniel Kinsaul
(74) *Attorney, Agent, or Firm* — Kubotera & Associates, LLC

(57) ABSTRACT

An image processing device includes an image input device for inputting image information; a control device for converting the image information into an electric file input through the image input device; a display device for displaying file name candidates; a selection device for selecting and specifying a file name candidate selected by a user from the file name candidates displayed on the display device; and a first storage device for storing an image data file. The control device stores the image data file in the first storage device. In the image data file, the file name specified by the selection device corresponds to the electrical file of the image information.

4 Claims, 17 Drawing Sheets

| Key group 1 | Key group 2 |
|---|---|
| Conference minutes | Store |
| Catalog | February |
| Meeting | |

Fig. 6

[Key Group 1] + _ + [Key Group 2] + [Three digit number].bmp

Fig. 8

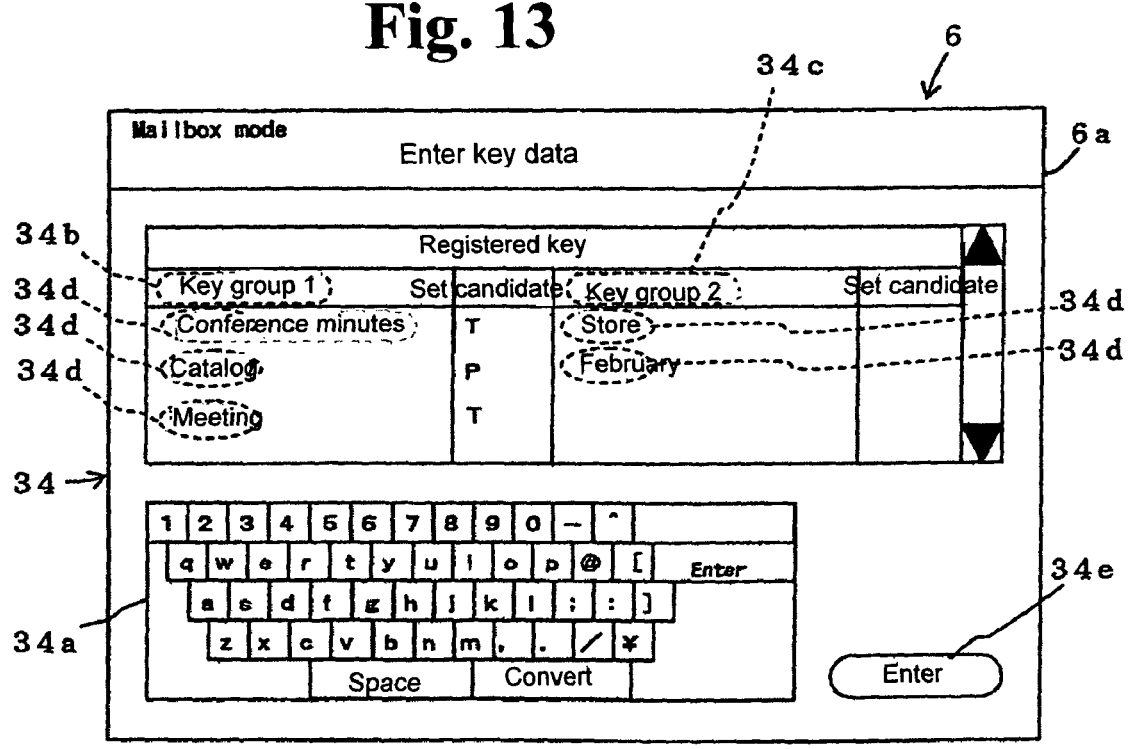

[Key Group 1] + _ + [Key Group 2] + [Three digit number].bmp

| Naming rule of code data | |
|---|---|
| 1 | Fixed value = estimate |
| 2 | % date |
| 3 | % time |
| 4 | Fixed value = in charge |
| 5 | Selected value = Yamada, Tanaka, Kobayashi |

Estimates January 1, 2004 10:11 in charge:Yamada.pdf
{Tanaka, Kobayashi}

IMAGE PROCESSING DEVICE

BACKGROUND OF THE INVENTION

The present invention relates to an image processing device, in particular, an image processing device capable of storing and managing image data.

An image processing device reads an image from an image input device, and process the image. In general, a user inputs read image information or a file name of electric data such as a setting set for reading an image through a keyboard. Alternatively, a serial number is assigned. Further, Japanese Patent Publication No. 05-12341 has disclosed a method in which a text specifying date or time is input.

When a serial number or a text specifying date or time is input as a file name of electric data, it may be difficult for a user to remember an purpose of the electric data with the file name afterward. When the user inputs the file name, it is necessary to input a text upon storing read image information, thereby causing troublesome.

In view of the problems described above, an object of the present invention is to provide an image processing device, in which it is possible to assign a name to electric data to be stored for easily identifying the content thereof afterward without causing troublesome to a user.

Further objects and advantages of the invention will be apparent from the following description of the invention.

SUMMARY OF THE INVENTION

In order to attain the objects described above, according to the present invention, an image processing device comprises an image input device for inputting image information; a control device for converting the image information into an electric file input through the image input device; a display device for displaying file name candidates; a selection device for selecting and specifying a file name candidate selected by a user from the file name candidates displayed by the display device; and a first storage device for storing an image data file. The control device stores the image data file in the first storage device. In the image data file, the file name specified by the selection device corresponds to the electrical file of the image information.

According to another aspect of the present invention, an image processing device comprises an image input device for inputting image information; a control device for converting the image information into an electric file input through the image input device; a display device for displaying file name candidates; a selection device for selecting specifying a file name candidate selected by a user from the file name candidates displayed by the display device; and a transmission control device for transmitting the electrical file of the image information. The control device controls the transmission control device to transmit the image data file. In the image data file, the file name specified by the selection device corresponds to the electrical file of the image information.

With the image processing device of the present invention, when the input image information is converted into the electrical file and stored, it is possible for a user to select the prepared file name candidate and assign an appropriate name without causing troublesome. The electric file is stored with the appropriate name, so that it is easy to confirm the content of the file, thereby making it convenient to store and manage the electric file.

BRIEF DESCRIPTION OF THE DRAWINGS

FIG. 6 is a table showing a relationship between a key group and key data to be stored in a second storage device of the image processing device according to the first embodiment of the present invention;

FIG. 8 is an explanatory view of a configuration of a file name candidate according to the first embodiment of the present invention;

FIG. 13 is a schematic view showing a "file name candidate setting" screen displayed on a touch panel when file name candidates are set in the image processing device according to the second embodiment of the present invention;

FIG. 14 is a table showing a relationship between a key group and key data to be stored in a second storage device of the image processing device according to the second embodiment of the present invention;

DETAILED DESCRIPTION OF THE PREFERRED EMBODIMENTS

Hereunder, embodiments of the present invention will be explained with reference to the accompanying drawings.

First Embodiment

Figure 1:
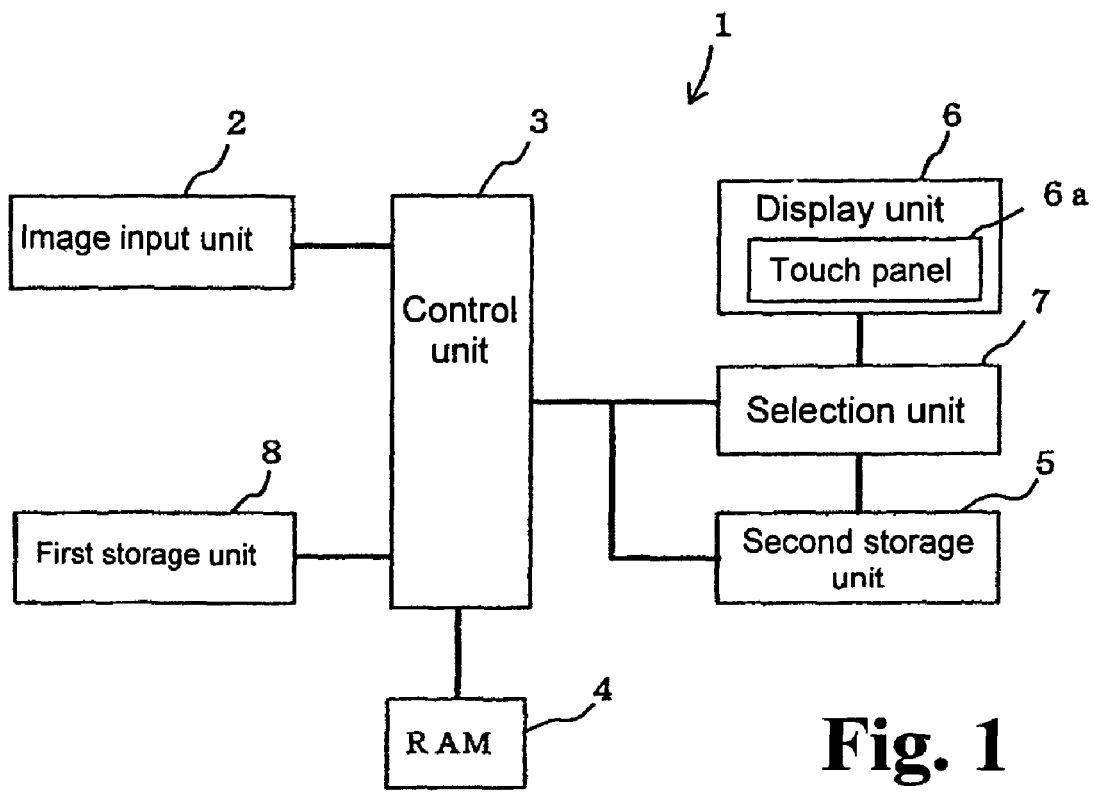
FIG. 1 is a block diagram showing a signal processing system of an image processing device according to a first embodiment of the present invention.
Figure 2:
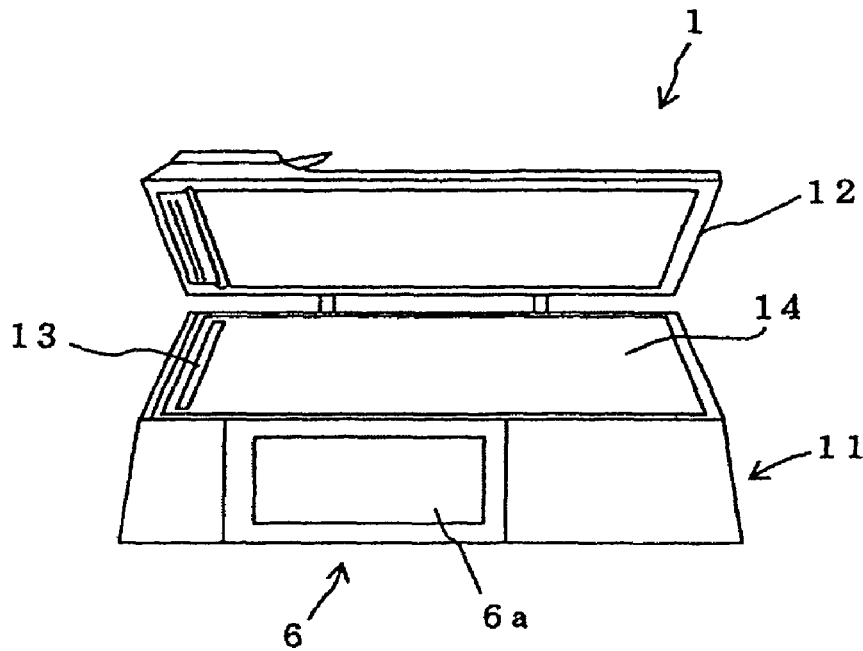
FIG. 2 is a schematic view showing the image processing device according to the first embodiment of the present invention.

FIG. 1 is a block diagram showing a signal processing system of an image processing device according to a first embodiment of the present invention. FIG. 2 is a schematic view showing the image processing device according to the first embodiment of the present invention.

As shown in FIG. 1, an image processing device 1 includes an image input device or an image input unit 2 capable of inputting image information; a control device or a control unit 3 for converting the image information into an electric file input through the image input unit 2; an RAM 4 for temporarily storing image data or the electrical file of the image information; a second storage device or a second storage unit 5 for storing key data to generate file name candidates (described later); a display device or a display unit 6 for displaying the generated file name candidates; a selection device or a selection unit 7 for selecting a specific file name candidate from the file name candidates displayed on a touch panel 6a of the display unit 6; and a first storage device or a first storage unit 8 for storing an image data file or the image data with a file name attached thereto.

As described later, the control unit 3 controls a specific constituent component to read out key data from the second storage unit 5 and generates file name candidates to be display on the display unit 6. Further, the control unit 3 controls a specific constituent component to assign or correspond a file name selected through the selection unit 7 to the electrical file of the image data and temporarily stored in the RAM 4, so that the image data file is stored in the first storage unit 8.

As shown in FIG. 2, the image processing device 1 has a device main body 11 and a document cover 12 rotatably attached to the device main body 11. The device main body 11 is provided with the display unit 6, a placing glass 14 for placing a document to be read, a document sensor 13 disposed inside the placing glass 14 for detecting the document on the placing glass 14, and an image reader (not shown) for reading the document. The display unit 6 has a display panel formed of the touch panel 6a. As described later, when a user presses the touch panel 6a, the display unit 6 detects contents of the operation and sends the detected information to the selection unit 7 (FIG. 1). In FIG. 2, the components for reading a document, i.e., the placing glass 14, the image reader, the document cover 12, and the document sensor 13 correspond to the image input unit 2 shown in FIG. 1.

Figure 3:
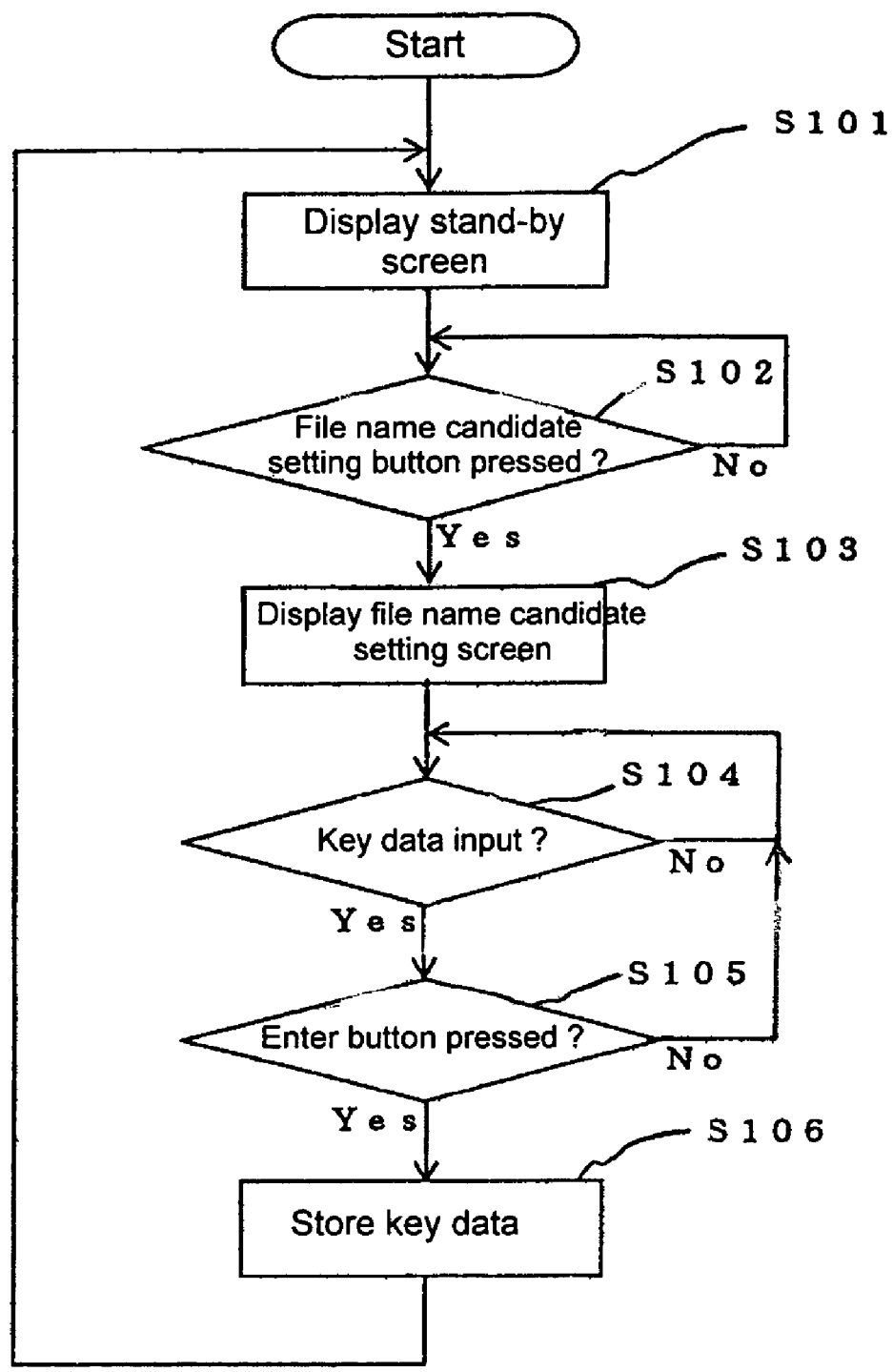
FIG. 3 is a flow chart showing a process of "file name candidate setting" in the image processing device according to the first embodiment of the present invention.

An operation of the image processing device 1 will be explained next. FIG. 3 is a flow chart showing a process of "file name candidate setting" in the image processing device 1 according to the first embodiment of the present invention. With reference to the flow chart, the process of "file name candidate setting" will be explained below.

Figure 4:
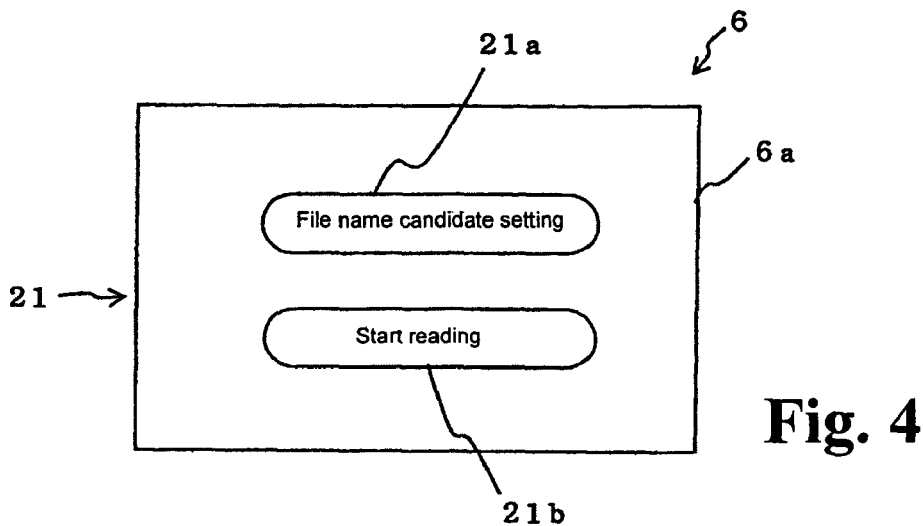
FIG. 4 is a schematic view showing a stand-by status displayed on a touch panel.

When the device is turned on and a program starts, as shown in FIG. 4, the control unit 3 controls the display unit 6 to display a stand-by screen 21 with a "file name candidate setting" button 21a and a "start reading" button 21b on a display panel thereof, i.e., the touch panel 6a (step S101). The device becomes a stand-by state for watching a user to press the "file name candidate setting" button 21a (step S102). When the control unit 3 detects that the user presses the "file name candidate setting" button 21a (FIG. 4) through the selection unit 7, the display unit 6 displays a "file name candidate setting" screen 22 shown in FIG. 5 on the touch panel 6a (FIG. 1; step S103).

Figure 5:
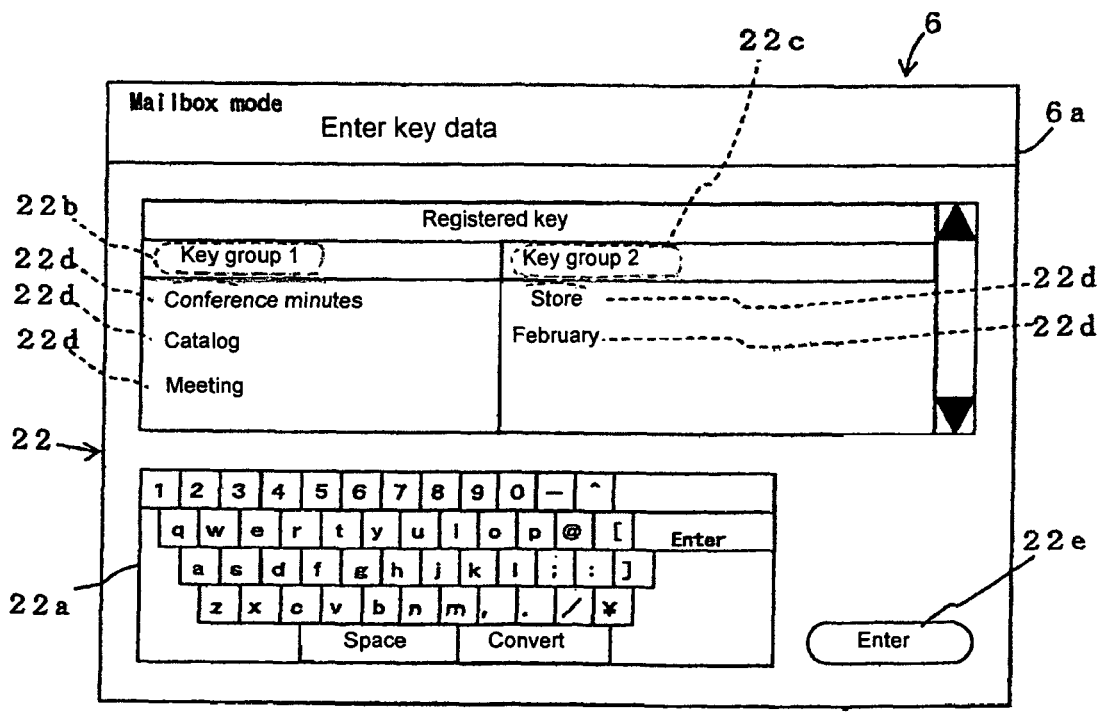
FIG. 5 is a schematic view showing a "file name candidate setting" screen displayed on the touch panel when file name candidates are set in the image processing device according to the first embodiment of the present invention.

Next, it is watched that the user inputs key data through a screen keyboard 22a disposed under the "file name candidate setting" screen 22 shown in FIG. 5 (step S104). In this case, the key data include data necessary for generating the file name candidates. When the key data are input, a region 22b of a key group 1 or a region 22c of a key group 2 is pressed to register new key data relative to the key group 1 or the key group 2. When a region 22b of already registered key data is pressed, a text of each key data can be edited.

After the new key data are input or the existing key data are edited, the control unit 3 watches the user to press an "enter" button 22e in the "file name candidate setting" screen 22 shown in FIG. 5 for setting the input (step S105). When it is confirmed that the "enter" button 22e is pressed, the selection unit 7 (FIG. 1) stores the set key data in the second storage unit 5 (step S106). As shown in FIG. 6, the set key data are stored in the second storage unit 5 to correspond to the key group 1 or the key group 2, respectively. Afterward, the device returns to step S101 in the stand-by state, thereby making it possible to repeat the process of "file name candidate setting".

Figure 7:
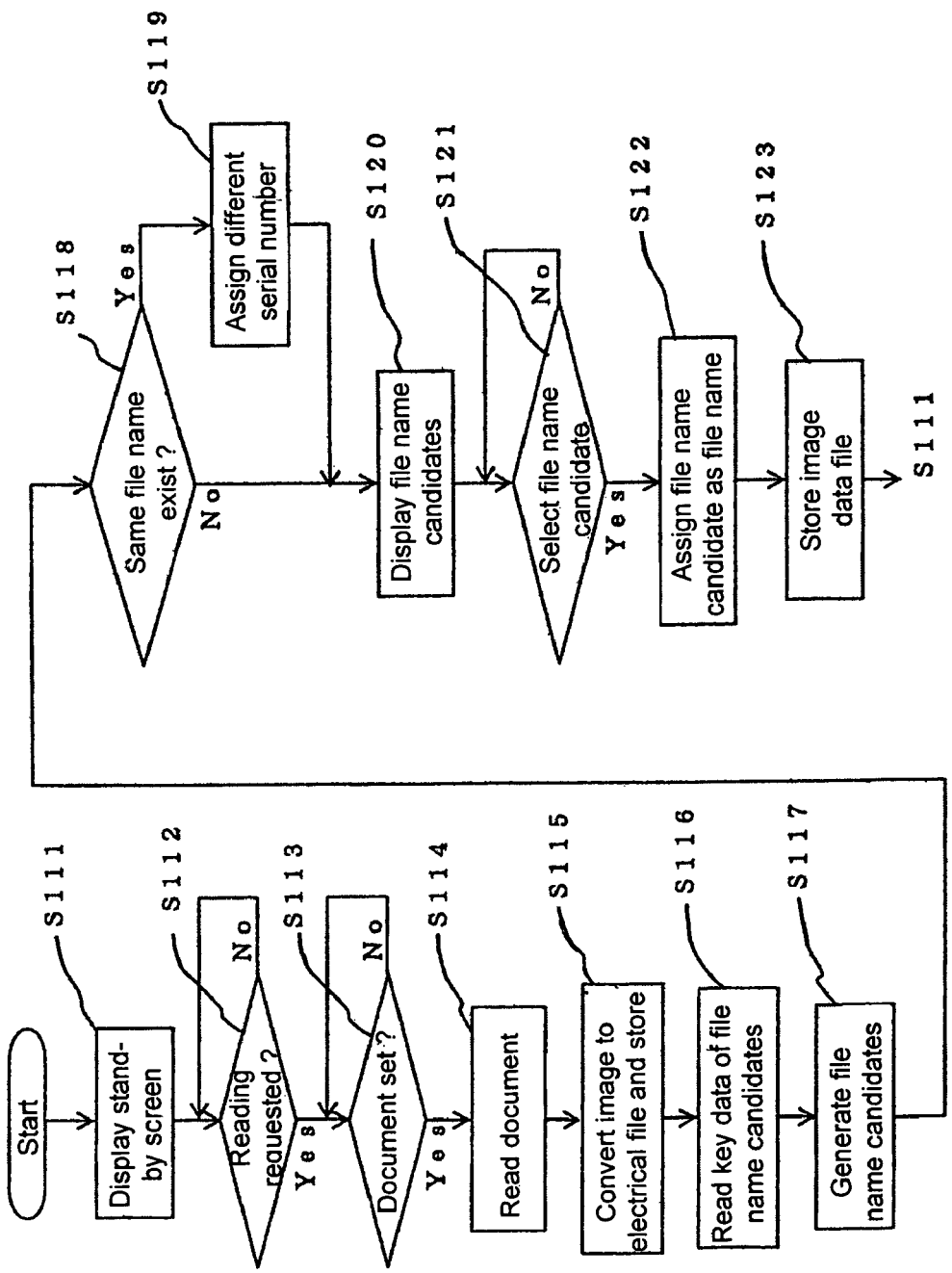
FIG. 7 is a flow chart showing a process of "file name assigning" in the image processing device according to the first embodiment of the present invention.

A process of "file name assigning" will be explained next, in which a file name is assigned to the read image data using the key data set with the "file name candidate setting" screen 22 (FIG. 5). FIG. 7 is a flow chart showing the process of "file name assigning" in the image processing device according to the first embodiment of the present invention. The process of "file name assigning" will be explained with reference to the flow chart.

When the device is turned on and a program starts, as shown in FIG. 4, the control unit 3 (FIG. 1) controls the display unit 6 to display the stand-by screen 21 with the "file name candidate setting" button 21a and the "start reading" button 21b on the touch panel 6a thereof (step S111). The device becomes a stand-by state for watching a user to press the "file name candidate setting" button 21a (step S112).

When the user executes the process of "file name assigning", after a document is placed on the placing glass 14 of the image processing device 1 (FIG. 2), the user presses the "start reading" button 21b to request reading. When the control unit 3 detects that the user presses the "start reading" button 21b through the selection unit 7, the control unit 3 controls the document sensor 13 (FIG. 2) to confirm that the document to be read is set (step S113), and controls the image processing device 1 to start reading the document (step S114). If the document is not set, the device waits until the document is set in step S113. Alternatively, a prompt for setting the document may be displayed.

Afterward, the control unit 3 converts the read image into an electrical file, and the electrical file is temporarily stored in the RAM 4 (step S115). Then, the selection unit 7 reads the key data of the file name candidates stored in the second storage unit 5 (step S116), so that the file name candidates are generated as follows (step S117).

In a process of generating the file name candidates, as shown in FIG. 8, "text of the key group 1", "under bar", and "text of the key group 2" are sequentially combined. Then, a three-digit serial number is assigned, and a file extension is attached. This process is applied to all of the combinations. Instead of the process described above, "file" and "serial number" may be simply combined. At this time, the selection unit 7 checks a file name of the image data file already stored in the first storage unit 8 to confirm whether a same file name exists (step S118). When a same file name exists, a different serial number is assigned (step S119).

Figure 9:
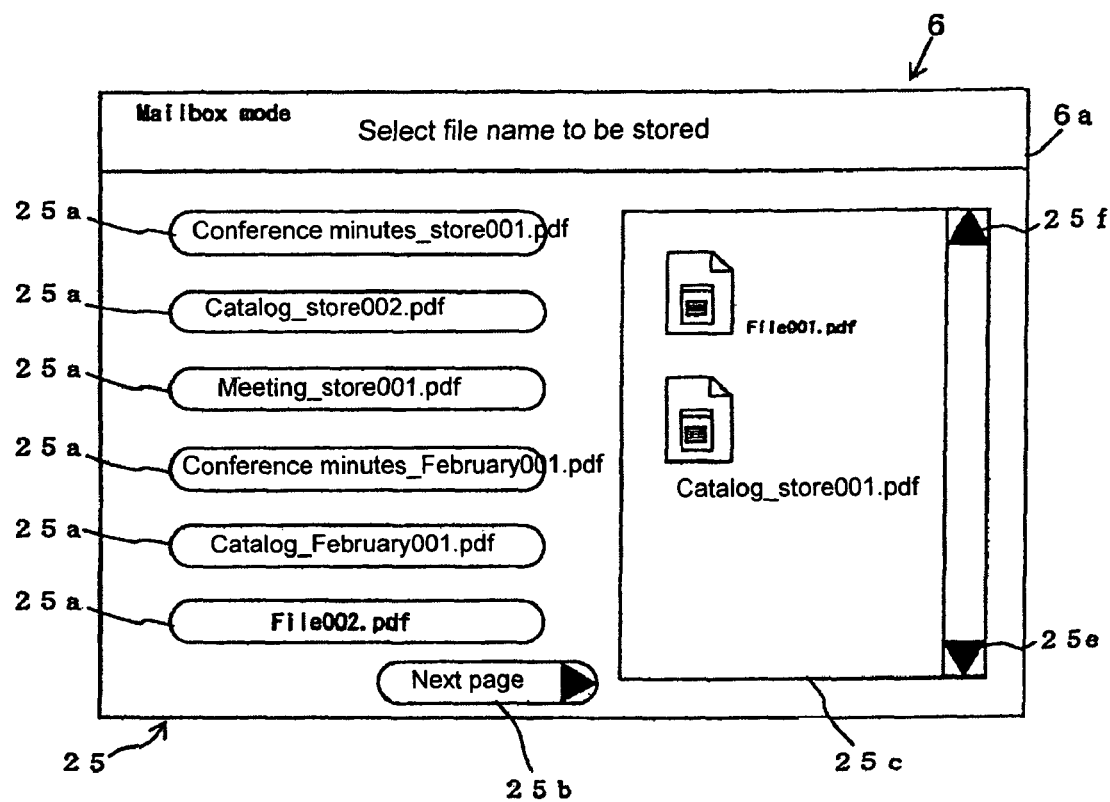
FIG. 9 is a schematic view showing a "file name selection" screen for displaying a generated file name candidate according to the first embodiment of the present invention.

After the file name candidates are generated as described above, the file name candidates are displayed on the touch panel 6a (FIG. 2; step S120). FIG. 9 is a schematic view showing a "file name selection" screen 25 for displaying the generated file name candidates.

The user refers to the "file name selection" screen 25, and selects a file name candidate most appropriate for the image data temporarily stored in the RAM 4 as a file name from the list of the displayed file name candidates. Then, the user presses a file name candidate displayed area 25a showing the file name candidate. The control unit 3 watches the user to press the file name candidate displayed area 25a (step S121). When it is confirmed that the user presses the file name candidate displayed area 25a, the file name candidate in the file name candidate displayed area 25a is stored in, for example, a different area of the second storage unit 5 as a file name (step S122). The file name is assigned to the electrical file of the image data and temporarily stored in the RAM 4 to generate the image data file, and the image data file is stored in the first storage unit 8 (step S123). Afterward, the device returns to step S111 in the stand-by state, thereby making it possible to repeat the process of "file name assigning".

In the "file name selection" screen 25, a next page button 25b is operated for sequentially displaying remaining file name candidates when there are any; a data display area 25c displays icons representing file names of the image data files already stored; and arrows 25e and 25f are operated for sequentially scrolling the icons.

In the image processing device 1 according to the first embodiment of the present invention, the file name candidates are generated as all of the combinations of the key data belonging to each key group, and the generated file name candidates are displayed on the "file name selection" screen 25 shown in FIG. 9. When a fourth storage unit (not shown) is provided for storing file name candidate information, it is possible to read out the key data from the second storage unit 5 and display the file name candidates according to the file name candidate information as explained below.

When sending the reading command in step S112, according to contents of the set document, the user inputs the file name candidate information such as "conference minutes" suitable for the contents. In inputting the file name candidate information, for example, the stand-by screen 21 displays an input frame (not shown) for inputting the file name candidate information and a screen keyboard similar to the screen keyboard 22a shown in FIG. 5. The user may operate the screen keyboard to input the file name candidate information in the input frame.

At this time, the selection unit 7 stores a text of "conference minutes", i.e., the input file name candidate information, in the fourth storage unit. When the file name candidate is generated in step S117, if "conference minutes" exists in the key group 1 as the key data, the key data other than "conference minutes" are not used as the file name candidates of the key group 1. Accordingly, the file name candidates not to be used are not generated, and only a file name candidate similar to one the user requests is displayed. Therefore, it is possible to reduce the number of the file name candidates, thereby making it easy for the user to select the file name candidate.

Figure 10:
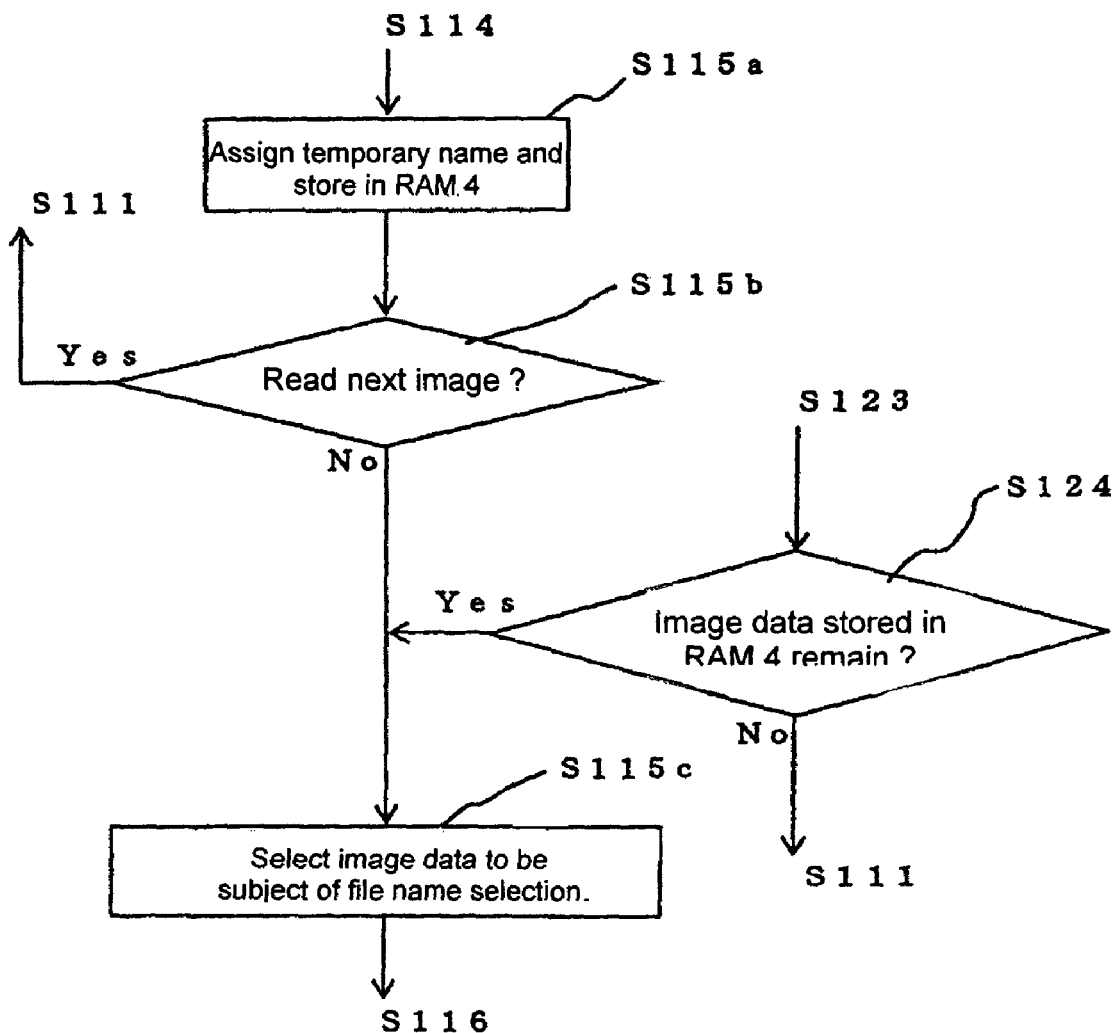
FIG. 10 is a flow chart showing another process according to the first embodiment of the present invention.

In the present embodiment, one file name is assigned to one image data. Alternatively, after a plurality of images is read, a plurality of file names may be assigned to the images all at once. In this case, instead of step S115 of the flow chart in FIG. 7, as shown in FIG. 10, steps S115a, S115b, and S115c are executed, and step S124 is executed after step S124.

That is, after the image is read in step S114, when the electrical file of the image data is stored in the RAM 4, a temporary file name is assigned and the image data is stored (step S115a). Then, it is selected whether the next reading is performed or the file name is selected from the file name candidates (step S115b). Accordingly, in step S115b, the touch panel 6a displays a screen (not shown) including a button for executing the next reading and a button for selecting the file name from the file name candidates. When the user presses the button for executing the next reading, the process returns to step S111 to execute the next reading. When the user presses the button for selecting the file name from the file name candidates, the process proceeds to step S115c.

In step S115c, when a plurality of image data is stored in the RAM 4, the image data to be subject of the file name selection are sequentially selected in an input order. Through step S116 to step S123 (FIG. 7), the image data file with the file name corresponding to the image data selected in the step is stored in the first storage unit 8.

In step S124, when the image data still remain in the RAM 4, the process returns to step S115c, and the file names are sequentially assigned to the image data remaining in the RAM 4 to be stored in the first storage unit 8. Accordingly, after a plurality of images is read, it is possible to assign a plurality of file names to the images all at once.

In the image processing device 1 according to the present embodiment, in steps S102, S104, and S105 in the flow chart shown in FIG. 3, it is set to continue the state for waiting an operation of the user. Alternatively, it may be set such that, when an operation is not performed for a specific period of time in each step, the process returns to step S101 to become the stand-by state. A similar setting is possible in steps S112, S113, and S121 in the flow chart shown in FIG. 7.

In the present embodiment, the image process device simply reads and stores the images. The invention is not limited thereto, and as far as the device has the function of storing an image, the invention is applicable to an MFP (Multifunction Peripherals) having a combined function of a fax machine, a copier, and a printer.

In the present embodiment, the control unit 3 assigns the file name to the image data temporarily stored in the RAM 4, and stores the image data in the first storage unit 8. Alternatively, set information such as a gamma value, resolution, color hue, and a sheet size is also temporarily stored in the RAM 4 as set data. The file name same as the file name of the image data is assigned to the set data to form a set data file, and the set data file is stored in the first storage unit 8. In this case, instead of ".bmp", an extension of ".set" may be used for differentiation.

In the present embodiment, the control unit 3 assigns the file name to the image data temporarily stored in the RAM 4, and stores the image data in the first storage unit 8. Alternatively, history information regarding the reading of the image data, a set of settings when a same document is read with a different set of settings, or history information such as reading time may be temporarily stored in the RAM 4 as an electrical file of history data. The file name same as the file name of the image data is assigned to the history data to form a history data file, and the history data file is stored in the first storage unit 8. In this case, instead of ".bmp", an extension of ".his" may be used for differentiation.

In the present embodiment, the process includes the step of inputting the key data to generate the file name candidates. Alternatively, a plurality of file name candidates may be stored in advance. In this case, it is not necessary to input the key data to generate the file name candidates, thereby making it easier to operate.

In the present embodiment, the image data file with the file name assigned is stored in the storage unit (the first storage unit 8) in the image processing device. The image data file may be stored in a storage unit outside the image processing device such as a file server.

As described above, in the image processing device according to the first embodiment, a plurality of file name candidates is displayed, and the file name candidate is selected from the file name candidates to assign the file name. Accordingly, when the electrical file of the image data is assigned with the file name and stored, it is not necessary for the user to input the file name, thereby making it easy to assign the file name. Further, the electrical file of the image data is assigned with an appropriate file name and stored. Accordingly, it is possible to confirm the contents of the electrical file, and it is easy to remember what purpose the electric data is processed for. Therefore, it is easy to utilize the image data file and set data file later.

In the image processing device, the touch panel displays the file name candidates generated through combining with the key data stored in the second storage unit 5. Accordingly, as compared with a case that all of the file name candidates to be displayed are stored, it is possible to save a memory capacity of the storage unit.

Second Embodiment

Figure 11:
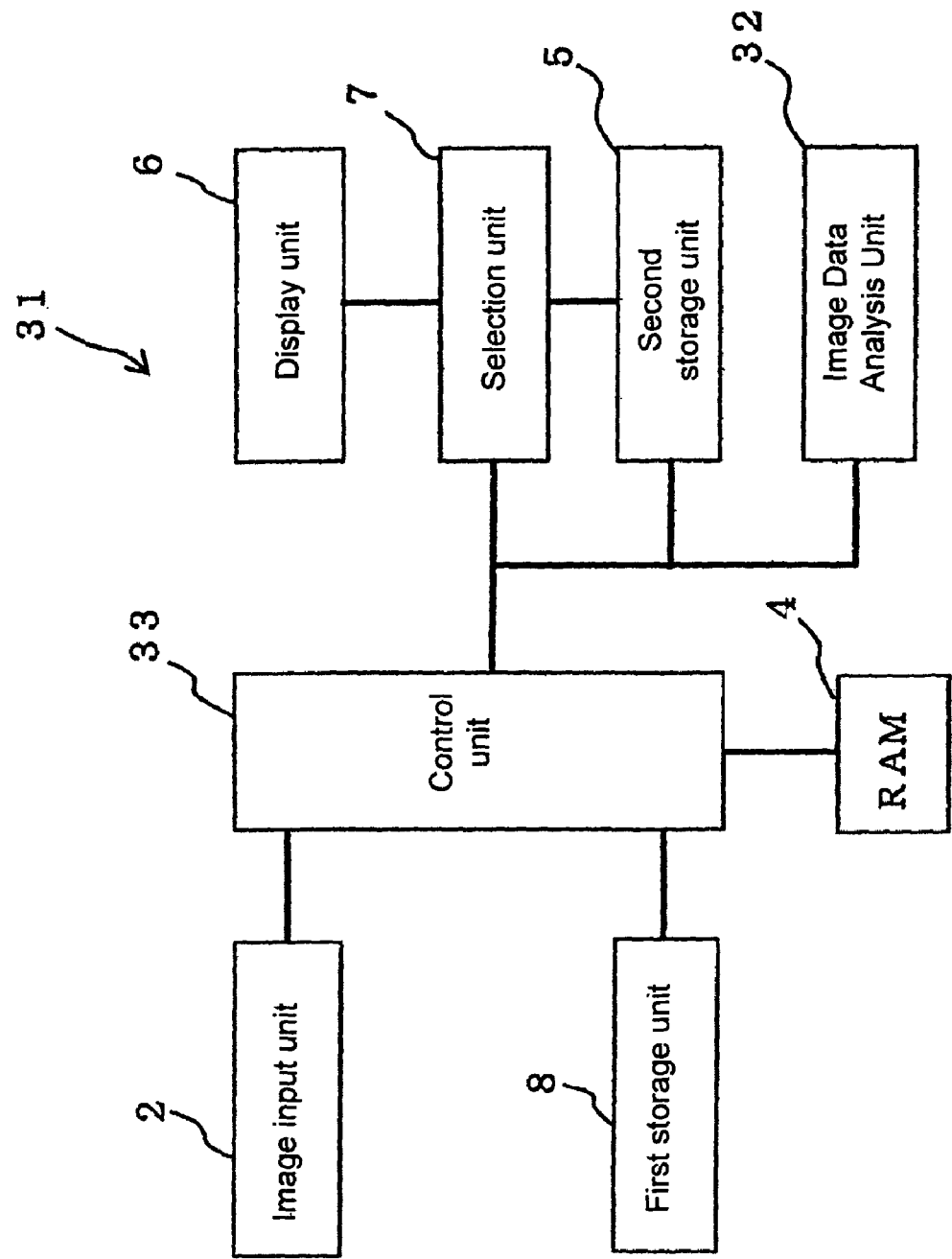
FIG. 11 is a block diagram showing a signal processing system of an image processing device according to a second embodiment of the present invention.

FIG. 11 is a block diagram showing a signal processing system of an image processing device 31 according to a second embodiment of the present invention. In the image processing device 31 of the second embodiment, features different from the image processing device 1 of the first embodiment include an image analysis device or an image analysis unit 32 and a process of a control device or a control unit 33. Accordingly, the same reference numerals denote components of the image processing device 31 same as those in the image processing device 1 (FIG. 1), and figures thereof or explanations thereof are omitted.

The image analysis unit 32 analyzes reliability of the image data input through the image input unit 2. That is, the image analysis unit 32 calculates continuity of white bits and frequency of changes from a white bit to a bit other than a white bit in the image data. When the continuity of white bits is high and the frequency of changes from white to other than white is low, it is determined that the image data is a text document. On the other hand, when the continuity of white bits is low and the frequency of changes from white to other than white is high, it is determined that the image data is a photograph document. When it is determined that the image data is whether a text document or a photograph document, values of the continuity of white bits and the frequency of changes from white to other than white calculated from the image data are compared with statistically determined constant values.

Figure 12:
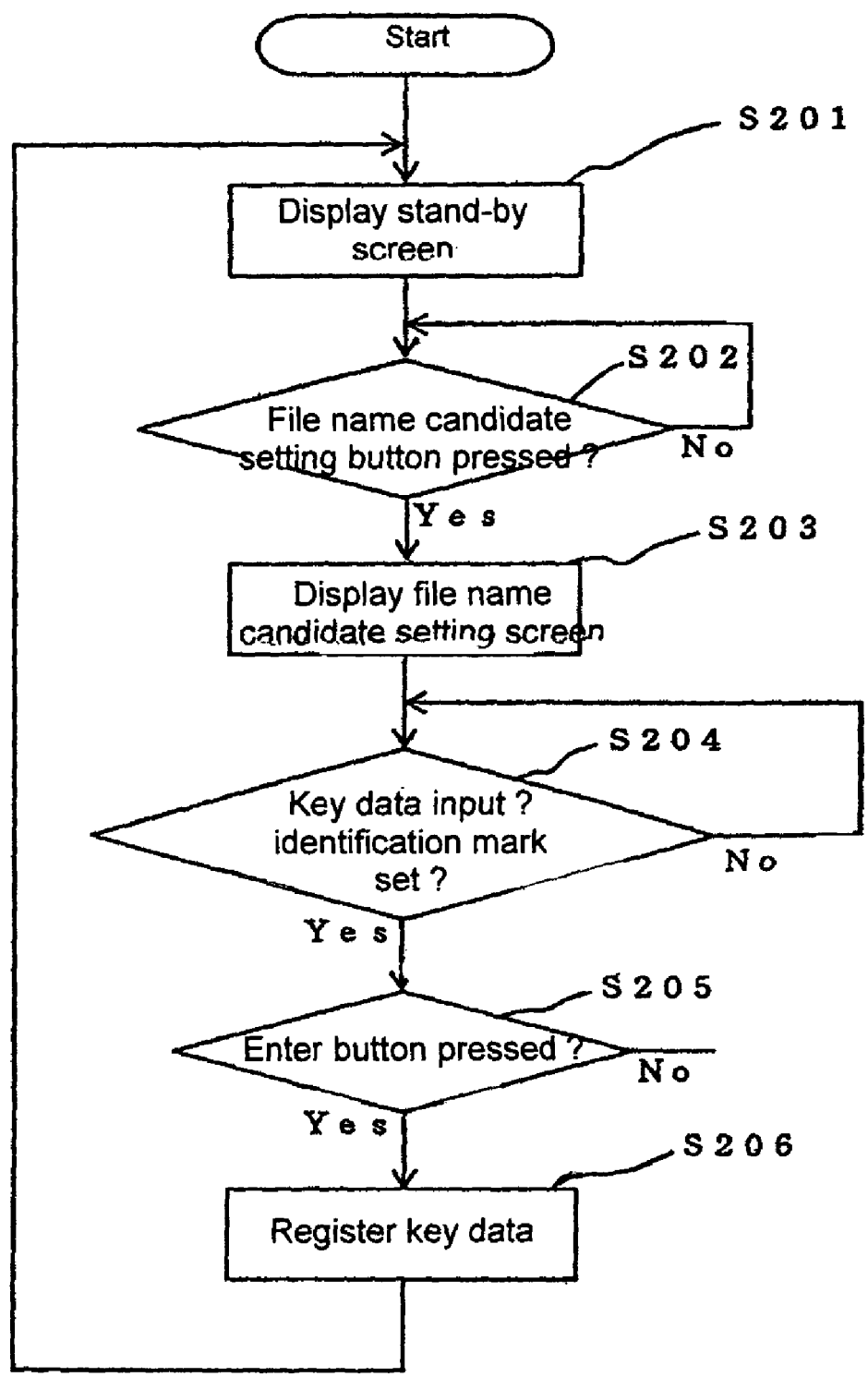
FIG. 12 is a flow chart showing a process of "file name candidate setting" in the image processing device according to the second embodiment of the present invention.

An operation of the image processing device 31 will be explained next. FIG. 12 is a flow chart showing a process of "file name candidate setting" in the image processing device 31. The process of "file name candidate setting" will be explained with reference to the flow chart.

When the device is turned on and a program starts, as shown in FIG. 4, the control unit 33 controls the display unit 6 to display the stand-by screen 21 with the "file name candidate setting" button 21*a* and the "start reading" button 21*b* on the touch panel 6*a* (step S201). The device becomes a stand-by state for watching a user to press the "file name candidate setting" button 21*a* (step S202). When the control unit 33 detects that the user presses the "file name candidate setting" button 21*a* (FIG. 4) through the selection unit 7, the display unit 6 displays a "file name candidate setting" screen 34 shown in FIG. 13 on the touch panel 6*a* (step S203).

Next, it is watched that the user inputs the key data with a screen keyboard 34*a* disposed under the "file name candidate setting" screen 34 shown in FIG. 13, so that an identification mark (described later) is set as a candidate (step S204). In this case, the key data include data necessary for generating the file name candidates. When the key data are input, a region 34*b* of a key group 1 or a region 34*c* of a key group 2 is pressed to register new key data relative to the key group 1 or the key group 2. When a region 34*b* of key data already registered is pressed, a text of each key data can be edited.

The identification mark is used for determining that the key data can be used as the file name candidates in a process of "file name assigning" (described later) when the image data are determined to be a text document or a photograph document. In the "file name candidate setting" screen 34 shown in FIG. 13, every time when a candidate setting column at a right side of a raw displaying each key data is pressed, the candidate setting column is changed to an identification mark "P" to be the candidate when the image data are determined to be a photograph document; an identification mark "T" to be the candidate when the image data are determined to be a text document; or no mark to be the candidate in any cases. Accordingly, it is possible to select one of the three identification marks.

After the new key data are input or the existing key data are edited and the identification mark is set, the control unit 33 watches the user to press an "enter" button 34*e* in the "file name candidate setting" screen 34 (FIG. 13) for setting the input (step S205). When it is determined that the "enter" button 34*e* is pressed, the selection unit 7 (FIG. 11) stores the key data and the identification mark in the second storage unit 5 (step S206). As shown in FIG. 14, after setting the input, the key data are stored in the second storage unit 5 together with the identification marks corresponding to the key group 1 and the key group 2, respectively. Afterward, the device returns to step S201 in the stand-by state, thereby making it possible to repeat the process of "file name candidate setting".

Figure 15:
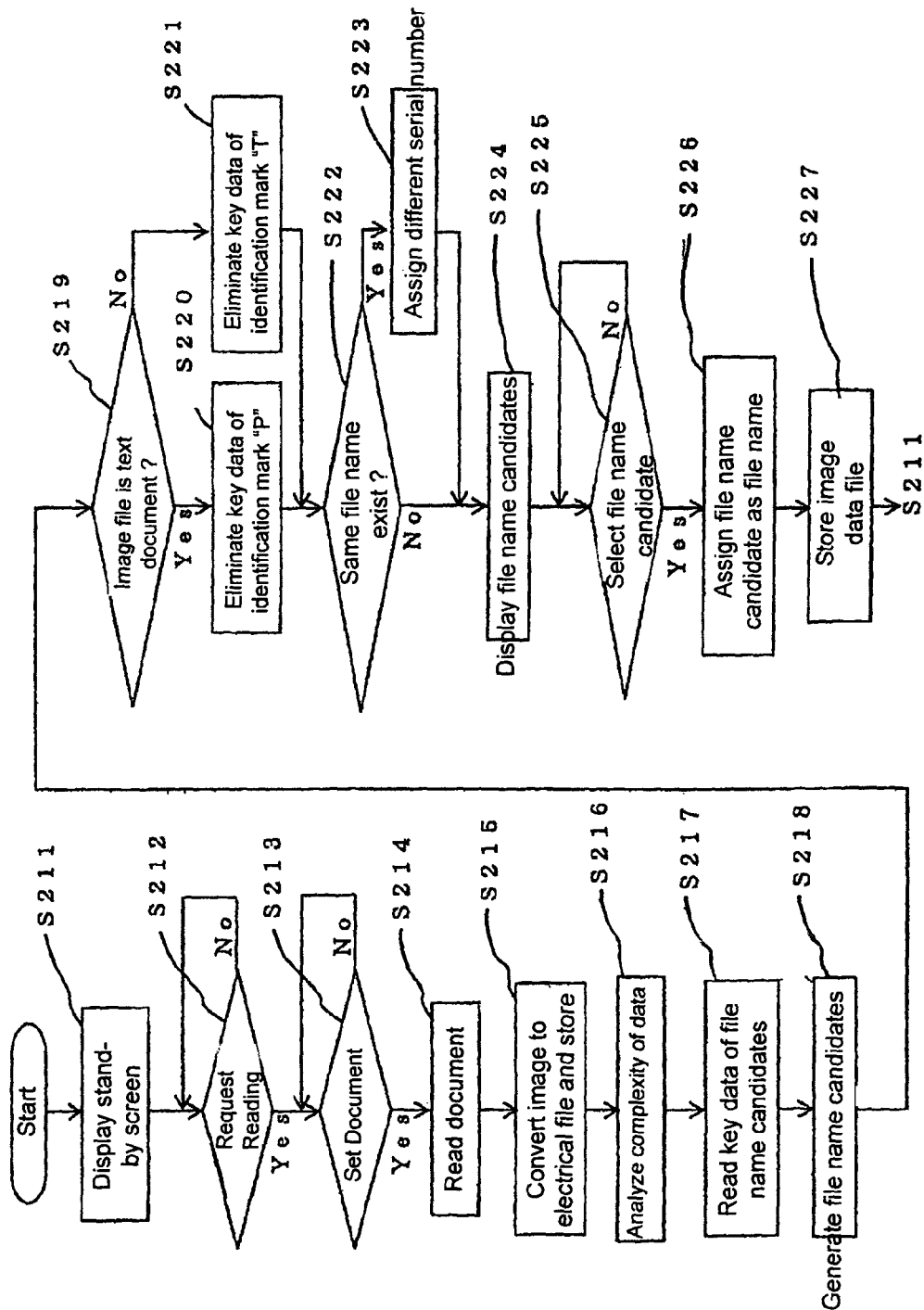
FIG. 15 is a flow chart showing a process of "file name assigning" in the image processing device according to the second embodiment of the present invention.

A process of "file name assigning" will be explained next, in which a file name is assigned to the read image data using the key data set with the "file name candidate setting" screen 34 (FIG. 13). FIG. 15 is a flow chart showing the process of "file name assigning" in the image processing device 31 according to the second embodiment of the present invention. The process of "file name assigning" will be explained with reference to the flow chart.

When the device is turned on and a program starts, as shown in FIG. 4, the control unit 33 (FIG. 11) displays the stand-by screen 21 with the "file name candidate setting" button 21*a* and the "start reading" button 21*b* on the touch panel 6*a* of the display unit 6 (step S211). The device becomes a stand-by state for watching a user to press the "file name candidate setting" button 21*a* (step S212).

When the user executes the process of "file name assigning", after a document is placed on the placing glass 14 of the image processing device 1 (FIG. 2), the user presses the "start reading" button 21*b* to request reading. When the control unit 33 detects that the user presses the "start reading" button 21b through the selection unit 7, the document sensor 13 (FIG. 2) confirms that the document to be read is set (step S213), and the control unit 33 controls the image processing device 1 to start reading the document (step S214). If the document is not set, the device waits until the document is set in step S213. Alternatively, a prompt for setting the document may be displayed.

Afterward, the control unit 33 converts the read image into an electrical file, and the electrical file is temporarily stored in the RAM 4 (step S215). The image analysis unit 32 analyzes complexity of the image data, that is, whether the read image data are a text document or a photograph document, and a result of the analysis is temporarily stored in the RAM 4 (step S216). Then, the selection unit 7 reads the key data of the file name candidates stored in the second storage unit 5 (step S217), so that the file name candidates are generated as follows (step S218).

Figures 16, 17:
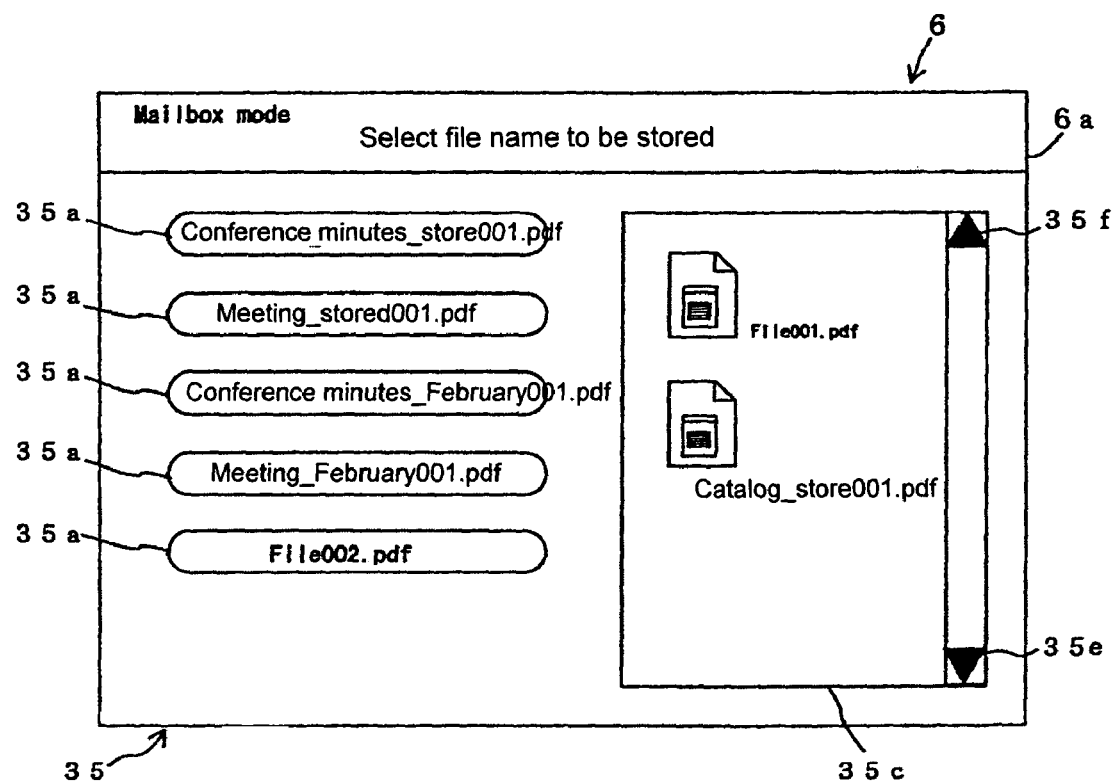
FIG. 16 is an explanatory view of a configuration of a file name candidate according to the second embodiment of the present invention.
FIG. 17 is a schematic view showing a "file name selection" screen for displaying a generated file name candidate according to the second embodiment of the present invention.

In a method of generating the file name candidates, as shown in FIG. 16, "text of the key group 1", "under bar", and "text of the key group 2" are sequentially combined. Then, a three-digit serial number is assigned, and a file extension is attached. This process is applied to all of the combinations.

At this time, the result of the analysis regarding the complexity of the image data in step S216 is referred (step S219). When the image analysis unit 32 determines that the read image is a text document, the file name candidate combined with the key data having the identification mark "P" in the candidate setting frame of the "file name candidate setting" screen 34 (FIG. 13) is eliminated (step S220). When the image analysis unit 32 determines that the read image is a photograph document, the file name candidate combined with the key data having the identification mark "T" in the candidate setting frame of the "file name candidate setting" screen 34 (FIG. 13) is eliminated (step S221).

Instead of the method described above, "file" and "serial number" may be simply combined. At this time, the selection unit 7 checks a file name of the image data file already stored in the first storage unit 8 to confirm whether a same file name exists (step S222). When a same file name exists, a different serial number is assigned (step S223).

After the file name candidates are generated as described above, the file name candidates are displayed on the touch panel 6a (step S224). FIG. 17 is a schematic view showing a "file name selection" screen 35 displayed on the touch panel 6a at this time. In FIG. 17, the read document is determined to be the text document in step S219, and is processed through step S220. Accordingly, the file name candidate combined with the key data having the identification mark "P" in the candidate setting frame of the "file name candidate setting" screen 34 (FIG. 13) is eliminated.

The user refers to the "file name selection" screen 35, and selects a file name candidate most appropriate for the image data temporarily stored in the RAM 4 as a file name from the list of the displayed file name candidates. Then, the user presses a file name candidate displayed area 35a showing the file name candidate. The control unit 33 watches the user to press the file name candidate displayed area 35a (step S225). When it is confirmed that the user presses the file name candidate displayed area 35a, the file name candidate in the file name candidate displayed area 35a is stored in, for example, a different area of the second storage unit 5 as a file name (step S226). The file name is assigned to the electrical file of the image data and temporarily stored in the RAM 4 to generate the image data file, and the image data file is stored in the first storage unit 8 (step S227). Afterward, the device returns to step S111 in the stand-by state, thereby making it possible to repeat the process of "file name assigning".

In the "file name selection" screen 35, a data display area 35c displays icons representing file names of the image data files already stored, and arrows 35e and 35f are operated for sequentially scrolling the icons.

In the present embodiment, the complexity of the read image data is analyzed. The invention is not limited to, and it is possible to analyze a color and brightness of an image to determine the contents of the document.

As described above, in the image processing device 31 of the second embodiment, the file name candidates are limited according to the contents of the image data. Accordingly, in addition to the advantages of the device of the first embodiment, it is possible for the user to quickly find a desired file name according to an application or a purpose of the document to be read, and to assign an appropriate file name without a special operation.

Third Embodiment

Figure 18:
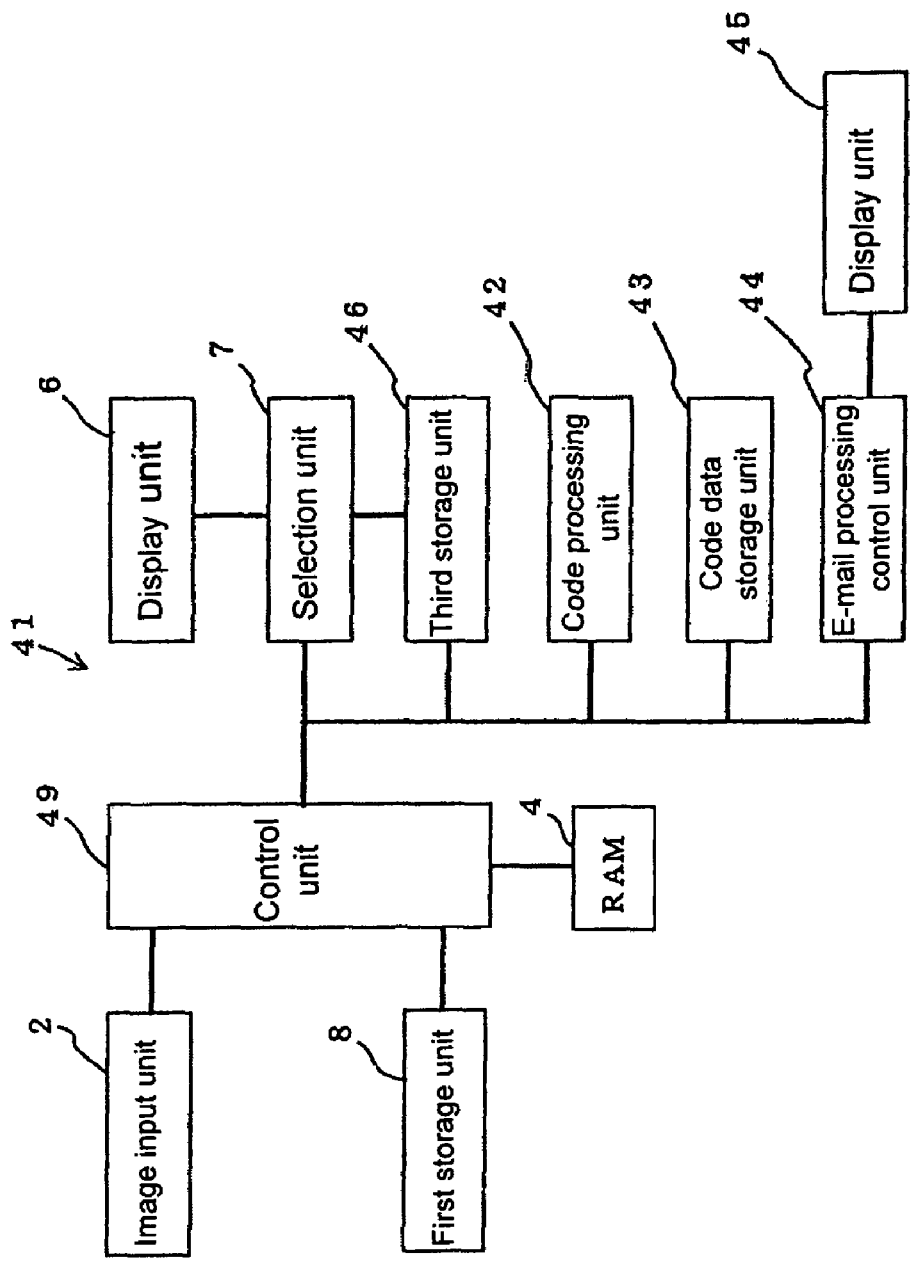
FIG. 18 is a block diagram showing a signal processing system of an image processing device according to a third embodiment of the present invention.

FIG. 18 is a block diagram showing a signal processing system of an image processing device 41 according to a third embodiment of the present invention. In the image processing device 41 of the third embodiment, features different from the image processing device 1 of the first embodiment include a code processing device or a code processing unit 42; a code data storage device or a code data storage unit 43; a transmission processing control device or an e-mail processing control unit 44; and a network interface 45. Further, a process of the control unit 33 and stored contents in a third storage unit 46 are different. Accordingly, the same reference numerals denote components of the image processing device 41 same as those in the image processing device 1 (FIG. 1), and figures thereof or explanations thereof are omitted.

The e-mail process control unit 44 controls e-mail communication with the image data input through the image input unit 2 and temporarily stored in the RAM 4 as an attached file. The network interface 45 includes a network interface card for communicating with an e-mail transmission server (not shown). The code processing unit 42 registers and analyzes a specific code of the read image, and the code data storage unit 43 stores a specific code data assigned with a code data number.

Figure 19:
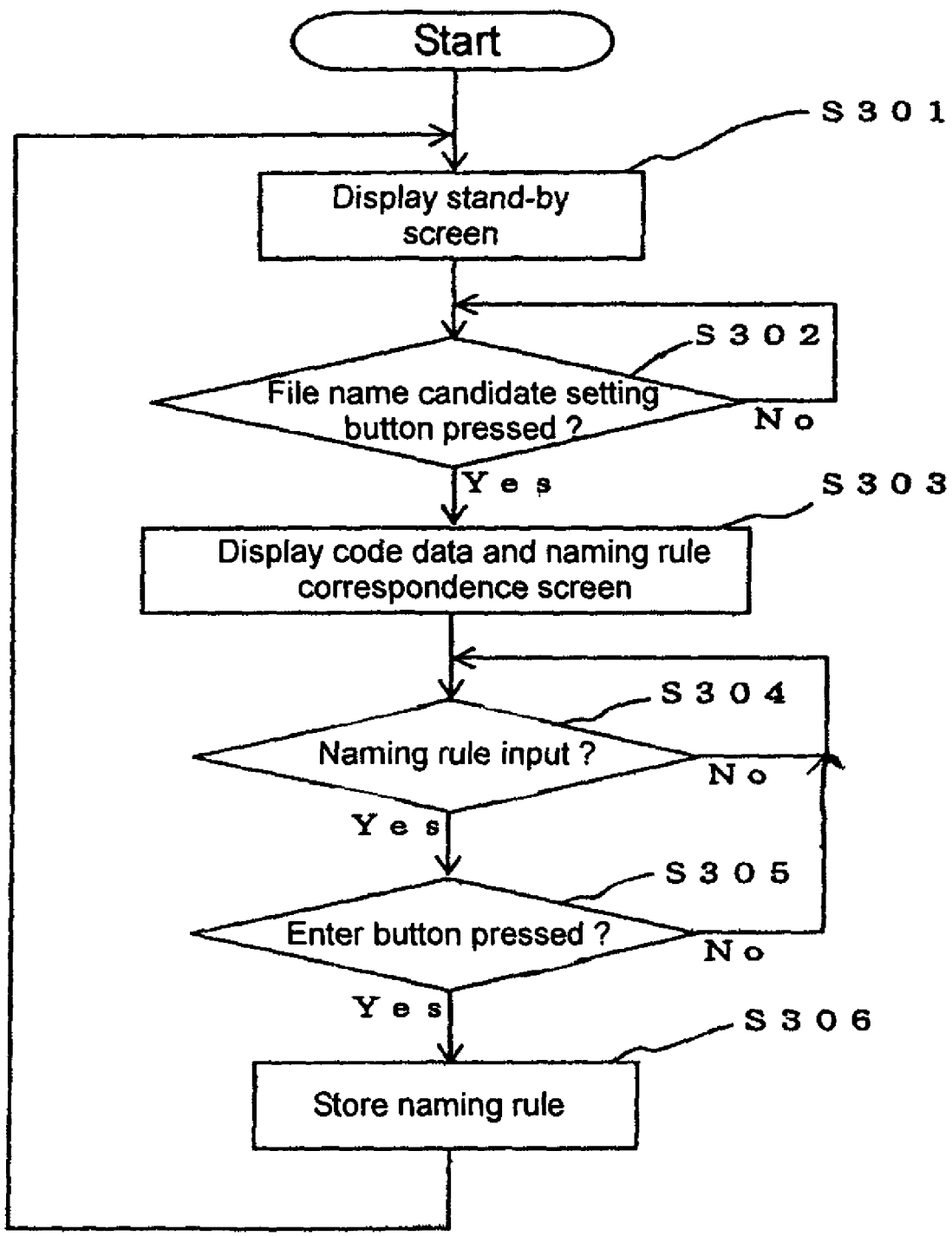
FIG. 19 is a flow chart showing a process of "file name candidate setting" in the image processing device according to the third embodiment of the present invention.

An operation of the image processing device 41 will be explained next. FIG. 19 is a flow chart showing a process of "file name candidate setting" in the image processing device 41. The process of "file name candidate setting" will be explained with reference to the flow chart.

When the device is turned on and a program starts, as shown in FIG. 4, a control device or a control unit 49 displays the stand-by screen 21 with the "file name candidate setting" button 21a and the "start reading" button 21b on the touch panel 6a of the display unit 6 (step S301). The device becomes a stand-by state for watching a user to press the "file name candidate setting" button 21a (step S302). When the control unit 49 detects that the user presses the "file name candidate setting" button 21a (FIG. 4) through the selection unit 7, the display unit 6 displays a "code data and naming rule correspondence" screen 47 shown in FIG. 20 on the touch panel 6a shown in FIG. 1 (step S303). The "code data and naming rule correspondence" screen 47 has a frame 47b for displaying the code data read out from the code data storage unit 43 and a naming rule input frame 47c for inputting a naming rule of the code data.

Figures 20, 21:
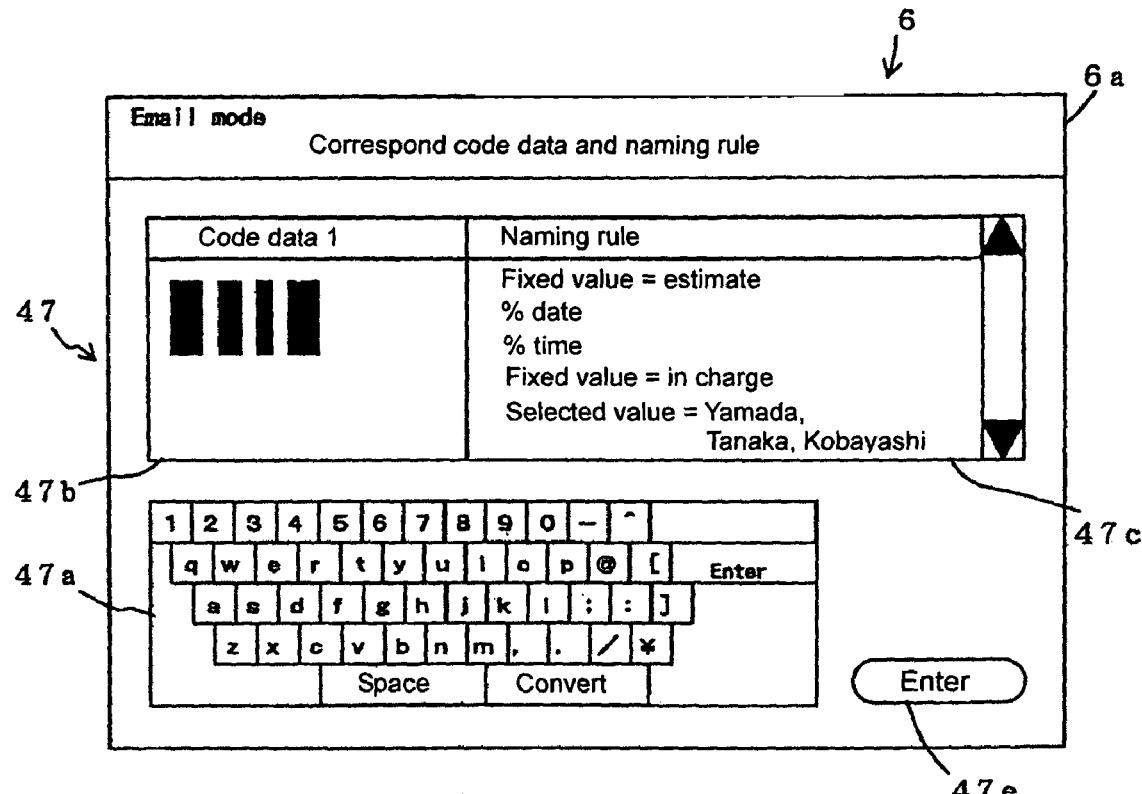
FIG. 20 is a schematic view showing a "code data and naming rule correspondence" screen displayed on a touch panel when file name candidates are set in the image processing device according to the third embodiment of the present invention.
FIG. 21 is a table showing a relationship between code data and naming rule to be stored in a third storage device of the image processing device according to the third embodiment of the present invention.

Next, it is watched that the user inputs the naming rule with a screen keyboard 47a disposed under the "code data and naming rule correspondence" screen 47 shown in FIG. 20 (step S304). In this case, the naming rule includes data necessary for generating the file name candidates.

After the naming rule is input, it is watched that the user to press an "enter" button 47*e* in the "code data and naming rule correspondence" screen 47 shown in FIG. 20 (step S305). When it is determined that the "enter" button 47*e* is pressed, the selection unit 7 (FIG. 1) stores the displayed code data and the naming rule (step S306). As shown in FIG. 21, after setting the input, the naming rule is stored in the third storage unit 46 corresponding to the code data 1.

A process of setting and applying the naming rule will be explained next. When the naming rule is set, a "fixed value" specifying a fixed text, "%" indicating a valuable, and a "selected value" specifying a text to be selected are used as command texts. A necessary letter is attached to the command texts to be sequentially written in the naming rule input frame 47*c* from top. In an example shown in FIG. 20, "fixed value=estimate", "% date", "% time", "fixed value=in charge", "selected value=Yamada, Tanaka, Kobayashi" are sequentially written in the naming rule input frame 47*c* from top. The device generates the file name candidates according to the naming rule thus set. In this case, texts converted sequentially from the top line according to each command text constitute the file name candidates.

Figures 23, 24:
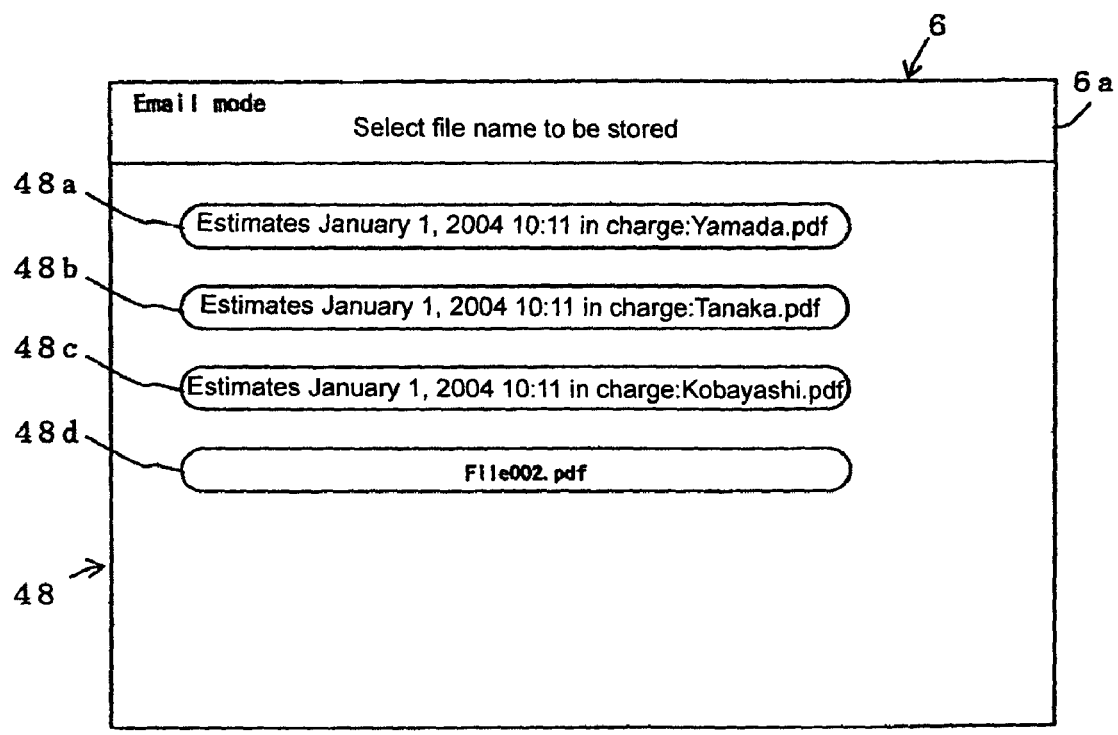
FIG. 23 is an explanatory view of a configuration of a file name candidate according to the third embodiment of the present invention.
FIG. 24 is a schematic view showing a "file name selection" screen for displaying a generated file name candidate according to the third embodiment of the present invention.

FIG. 23 is an explanatory view of an example of the file name candidate generated according to the naming rule described above. As described above, "fixed value=estimate", "% date", "% time", "fixed value=in charge", "selected value=Yamada, Tanaka, Kobayashi" are sequentially written in the naming rule input frame 47*c* from top. When the file name candidates are generated according to the naming rule, first, as shown in FIG. 23, "estimate" is assigned as a fixed text according to the command "fixed value=estimate". According to the command "% date", date when the image data is read, for example, Jan. 1, 2004, is assigned as a text. According to the command "% time", time when the image data is read, for example, 10:11, is assigned as a text. Finally, according to the command "fixed value=in charge", "in charge" is assigned as a fixed text.

Further, according to the command "selected value=Yamada, Tanaka, Kobayashi", at the end of a series of the texts described above, one of "Yamada, Tanaka, Kobayashi" is selected and assigned, thereby generating three file name candidates.

In step S306, the displayed code data and the corresponding naming rule are stored in the third storage unit 46. Afterward, the device returns to step S301 in the stand-by state, thereby making it possible to repeat the process of "file name candidate setting".

Figure 22:
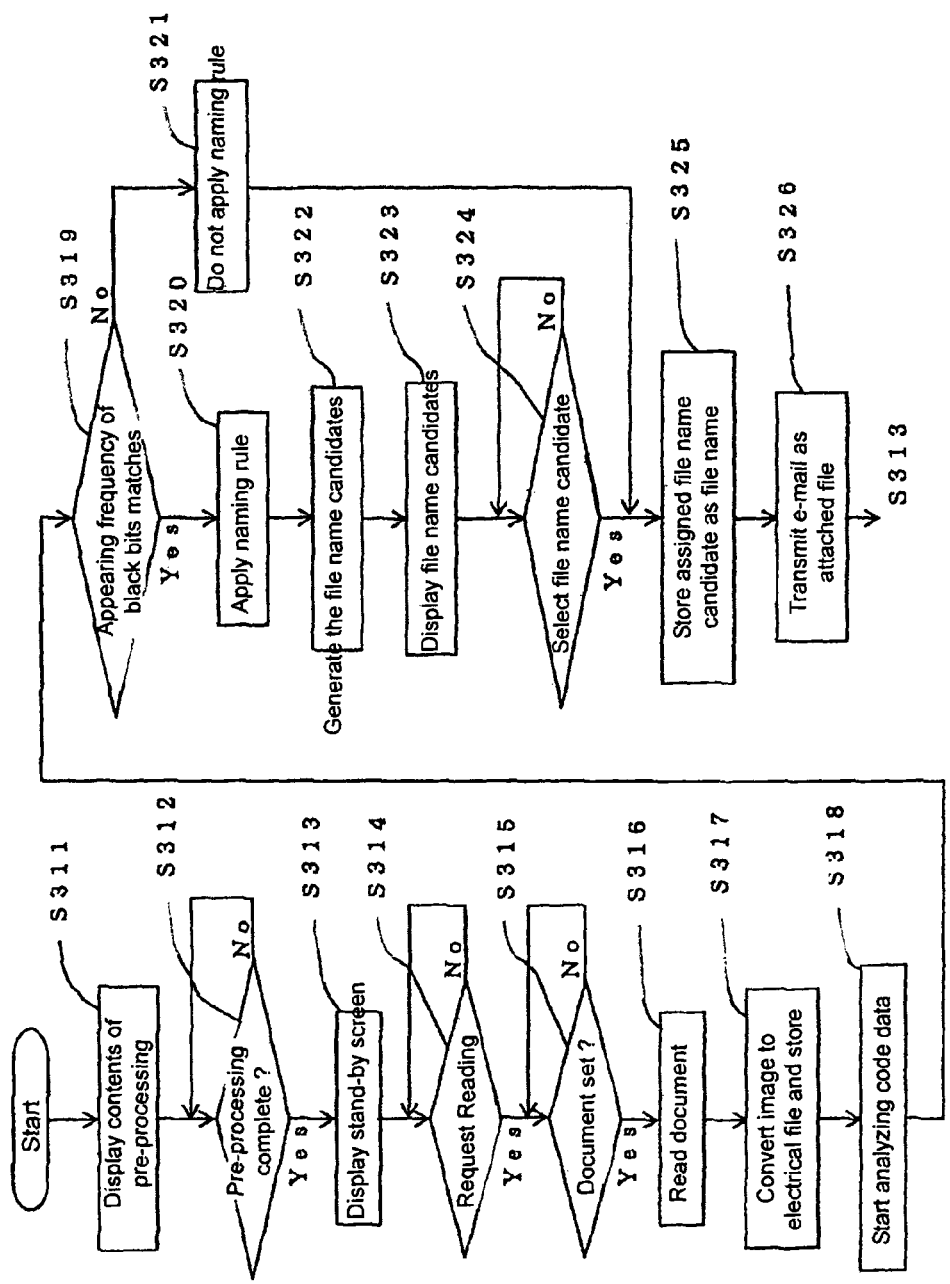
FIG. 22 is a flow chart showing a process of "file name assigning" in the image processing device according to the third embodiment of the present invention.

A process of "file name assigning" will be explained next, in which a file name is assigned to the read image data using the naming rule set through the "code data and naming rule correspondence" screen 47 (FIG. 20). FIG. 22 is a flow chart showing the process of "file name assigning" in the image processing device according to the first embodiment of the present invention. The process of "file name assigning" will be explained with reference to the flow chart.

When the device is turned on and a program starts, as shown in FIG. 4, the control unit 49 (FIG. 18) displays a screen on the touch panel 6*a* (FIG. 2) for prompting the user to perform a pre-processing (described later). The contents of the screen include a message prompting to write a pattern (for example, a bar code) same as the code data corresponding to the desirable naming rule in a specific location on a first page of the document to be input; and a frame for inputting an address and a subject of an e-mail (step S311). Then, it is watched that the user completes the displayed process and presses a finish button (not shown) on the touch panel 6*a* for notifying the completion (step S312).

When the user presses the finish button, as shown in FIG. 4, the control unit 49 displays the stand-by screen 21 with the "file name candidate setting" button 21*a* and the "start reading" button 21*b* on the touch panel 6*a* (FIG. 2) of the display unit 6 (step S313). The device becomes a stand-by state for watching the user to press the "start reading" button 21*b* (step S314).

When the user executes the process of "file name assigning", after a document is placed on the placing glass 14 of the image processing device 1 (FIG. 2), the user presses the "start reading" button 21*b* to request reading. When the control unit 49 detects that the user presses the "start reading" button 21*b* through the selection unit 7, the document sensor 13 confirms that the document to be read is set (step S315), and the control unit 49 controls the image processing device 1 to start reading the document (step S316) If the document is not set, the device waits until the document is set in step S315. Alternatively, a prompt for setting the document may be displayed. Then, the control unit 49 converts the read image into an electrical file, and the electrical file is temporarily stored in the RAM 4 (step S317).

The code processing unit 42 extracts a hand write portion with a code data pattern written by the user from the read image, and starts checking whether the code data corresponding to the code data pattern are stored in the third storage unit 46 together with the corresponding naming rule (step S319). In checking, the code processing unit 42 measures the number of black bits appearing from the left side (step S319). When the appearing number of the black bits does not match to the appearing number of the registered code data, the naming rule is not applied, and a file name simply combining "file" and "serial number" is prepared (step S321).

When the code data having the appearing number same as that of the checked black bits are stored in the third storage unit 46 together with the corresponding naming rule, the naming rule is applied (step S320). Then, the file name candidates are generated according to the naming rule as described above (step S322), and the generated file name candidates are displayed on the touch panel 6*a* (step S323). FIG. 24 shows a "file name selection" screen 48 displayed on the touch panel 6*a* at this time.

More specifically, in step S318 and step S319, it is determined whether the code data having the appearing number same as that of the checked black bits are stored in the code data storage unit 43 (FIG. 18). When it is determined that the code data are stored, it is further determined whether the code data having the code data number assigned to the code data are stored in the third storage unit 46 together with the corresponding naming rule. Only when the corresponding code data exist in the third storage unit 46, the process proceeds to step S320, otherwise proceeds to step S321.

In the "file name selection" screen 48 shown in FIG. 24, the file name candidates are displayed in a case that the code data 1 shown in FIG. 20 are selected. When the code data 1 shown in FIG. 20 are selected, the file name candidates are generated with the naming rule in FIG. 21 stored in the third storage unit 46, and are three types of file name candidates having different portions such as "Yamada", "Tanaka", and "Kobayashi". In the "file name selection" screen 48, file name candidate displaying areas 48*a*, 48*b*, and 48*c* displaying the three file name candidate are displayed. Also, a file name candidate displaying area 48*d* is displayed for displaying the file name candidate generated through step S321.

The user refers to the "file name selection" screen 48, and selects a file name candidate most appropriate for the image data temporarily stored in the RAM 4 as a file name from the list of the displayed file name candidates. Then, the user presses a file name candidate displayed area (one of the file name candidate displaying areas 48a, 48b, and 48c) showing the file name candidate. The control unit 49 watches the user to press the file name candidate displayed area (step S324). When it is confirmed that the user presses the file name candidate displayed area, the file name candidate in the file name candidate displayed area is stored in, for example, a different area of the third storage unit 46 as a file name (step S325).

When the process proceeds through step S321, the file name candidate generated in step S321 such as "File002.pdf" is unconditionally assigned. The e-mail control unit 44 sends an e-mail having the image data file as an attached file (step S326). In the image data file, the selected file name is assigned to the image data read with the image processing device 1 and temporarily stored in the RAM 3. Afterward, the device returns to step S313 in the stand-by state, thereby making it possible to repeat the process of "file name assigning". In step S326, before the e-mail having the image data file as an attached file is sent, similar to the embodiments described above, the e-mail may be stored in the first storage unit 8.

In the present embodiment, the file name of the image data is assigned to the e-mail. Through the similar process, it is possible to set a subject of the e-mail in addition to the attached file name.

As described above, in the image processing device 41 of the third embodiment, the code data are attached to a part of the document, thereby making it possible to extract the file name candidates. Accordingly, in addition to the advantages of the device of the first embodiment, it is possible for the user to easily set the display of the desired file name candidates, thereby improving the operation of the device. Further, it is easy to set the read image data as an attached file of e-mail.

The disclosure of Japanese Patent Application No. 2004-258213, filed on Sep. 6, 2004, is incorporated in the application.

While the invention has been explained with reference to the specific embodiments of the invention, the explanation is illustrative and the invention is limited only by the appended claims.

What is claimed is:

1. An image processing device, comprising:
an image input device for inputting image information;
a control device for converting the image information into an electric file;
a display device for displaying file name candidates;
a selection device for specifying a file name candidate selected by a user from the file name candidates;
a first storage device for storing an image data file;
a second storage device for storing a first group formed of a plurality of first key data and a second group formed of a plurality of second key data; and
an image analysis device for analyzing the image information to determine whether the image information is a text document or a photograph document, said control device eliminating the file name candidate with the key data having an identification mark "P" when the image analysis device determines that the image information is the text document, said control device eliminating the file name candidate with the key data having an identification mark "T" when the image analysis device determines that the image information is the photograph document, wherein
said control device stores the image data file including the electrical file of the image information having the file name candidate specified by the selection device and assigned thereto in the first storage device, said control device associates each of the first key data with each of the second key data and attaches a serial number to generate the file name candidates.

2. An image processing device, comprising:
an image input device for inputting image information;
a control device for converting the image information into an electric file;
a display device for displaying file name candidates;
a first storage device for storing a first group formed of a plurality of first key data and a second group formed of a plurality of second key data;
a selection device for specifying a file name candidate selected by a user from the file name candidates;
a transmission control device for transmitting an electrical file of data; and
an image analysis device for analyzing the image information to determine whether the image information is a text document or a photograph document, said control device eliminating the file name candidate with the key data having an identification mark "P" when the image analysis device determines that the image information is the text document, said control device eliminating the file name candidate with the key data having an identification mark "T" when the image analysis device determines that the image information is the photograph document, wherein
said control device controls the transmission control device to transmit an image data file including the electrical file of the image information having the file name candidate specified by the selection device and assigned thereto, said control device associates each of the first key data with each of the second key data and attaches a serial number to generate the file name candidates.

3. The image processing device according to claim 1, wherein said control device is arranged to attach a single character to the key data to generate the file name candidate according to the analysis result of the image analysis device.

4. The image processing device according to claim 2, wherein said control device is arranged to attach a single character to the key data to generate the file name candidate according to the analysis result of the image analysis device.

* * * * *